(12) United States Patent
Obregon

(10) Patent No.: US 10,592,585 B2
(45) Date of Patent: Mar. 17, 2020

(54) STOCHASTIC NETWORK TRAFFIC MODELING

(71) Applicant: Facebook, Inc., Menlo Park, CA (US)

(72) Inventor: Josue Israel Kuri Obregon, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 534 days.

(21) Appl. No.: 15/402,154

(22) Filed: Jan. 9, 2017

(65) Prior Publication Data

US 2018/0196893 A1 Jul. 12, 2018

(51) Int. Cl.
| | | |
|---|---|---|
| *G06F 17/10* | (2006.01) | |
| *G06F 17/18* | (2006.01) | |
| *H04L 12/24* | (2006.01) | |
| *G06F 17/50* | (2006.01) | |
| *H04L 12/26* | (2006.01) | |
| *G06F 7/60* | (2006.01) | |

(52) U.S. Cl.
CPC .............. *G06F 17/18* (2013.01); *G06F 17/50* (2013.01); *H04L 41/145* (2013.01); *H04L 43/0876* (2013.01); *G06F 17/5022* (2013.01); *G06F 2217/10* (2013.01); *H04L 41/12* (2013.01)

(58) Field of Classification Search
CPC .... G06F 17/50; H04L 41/145; H04L 43/0876
USPC ............................................................ 703/2
See application file for complete search history.

(56) References Cited

U.S. PATENT DOCUMENTS

2017/0147722 A1* 5/2017 Greenwood ............ G06F 17/00
2017/0308835 A1* 10/2017 Diao ................. G06Q 10/06315

OTHER PUBLICATIONS

Avramidis et al. (Simulation of Stochastic Activity Networks Using Path Control Variates, 19 pages). (Year: 1991).*
Jelitto et al. (A Vector Channel Model With Stochastic Fading Simulation, 5 pages). (Year: 1999).*

* cited by examiner

*Primary Examiner* — Andre Pierre Louis
(74) *Attorney, Agent, or Firm* — FisherBroyles, LLP

(57) ABSTRACT

A system and method for generating a stochastic model of network traffic demands in a network is disclosed. The system receives information characterizing a network to be modeled, the information including network component data describing the nodes of the network, demand data describing projected traffic demands for the overall network, and weight data describing which nodes contribute relatively more or less to traffic within the network. Using the network information, the system probabilistically allocates the projected traffic demands to the nodes of the network, over multiple trials, to generate a stochastic model of network traffic. In the stochastic model, flows within the network from a source node to a destination node are each associated with a distribution curve of demand that represents the probabilities of different levels of demand that may be required of each of the flows.

20 Claims, 8 Drawing Sheets

STOCHASTIC NETWORK TRAFFIC MODELING

BACKGROUND

Some entities, such as large corporations, government agencies, or universities, may maintain backbone networks to interconnect entity assets. For example, a corporate backbone network may be used to connect different data centers maintained by a corporation. Backbone networks may additionally include one or more points of presence for connecting the backbone network to the Internet. Backbone networks are themselves made up of connectivity devices, such as hubs, switches, and routers, as well as cables to connect the connectivity devices. These components of the backbone network provide the network capacity by which the data communication demands between assets (e.g., between data centers or computing devices) may be satisfied.

In order to increase backbone network capacity, an entity's network planners may engage in both short-term operational planning and long-term strategic planning. In the short-term, network planners may, for example, acquire additional capacity from an existing cable in the backbone network that has unused capacity, such as by paying for increased cable capacity. In the long-term, network planners may utilize new cables in the backbone network, thereby adding new routes between data centers in the network or augmenting existing routes between data centers.

Network planners typically perform both short-term and long-term planning based on the needs of the network. For example, a network planner may allocate more capacity between two assets in a network, or plan to allocate more capacity over time, to accommodate changes in demand between those assets. Traditionally, the demand between assets has been derived from currently-observed network conditions and estimates of how the network conditions will change over time. Typically, however, those estimates prove to be incorrect, thereby limiting the effectiveness of such forward-looking planning. It would therefore be beneficial to improve the modeling of future traffic demands of a network, thereby facilitating more effective early network planning.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
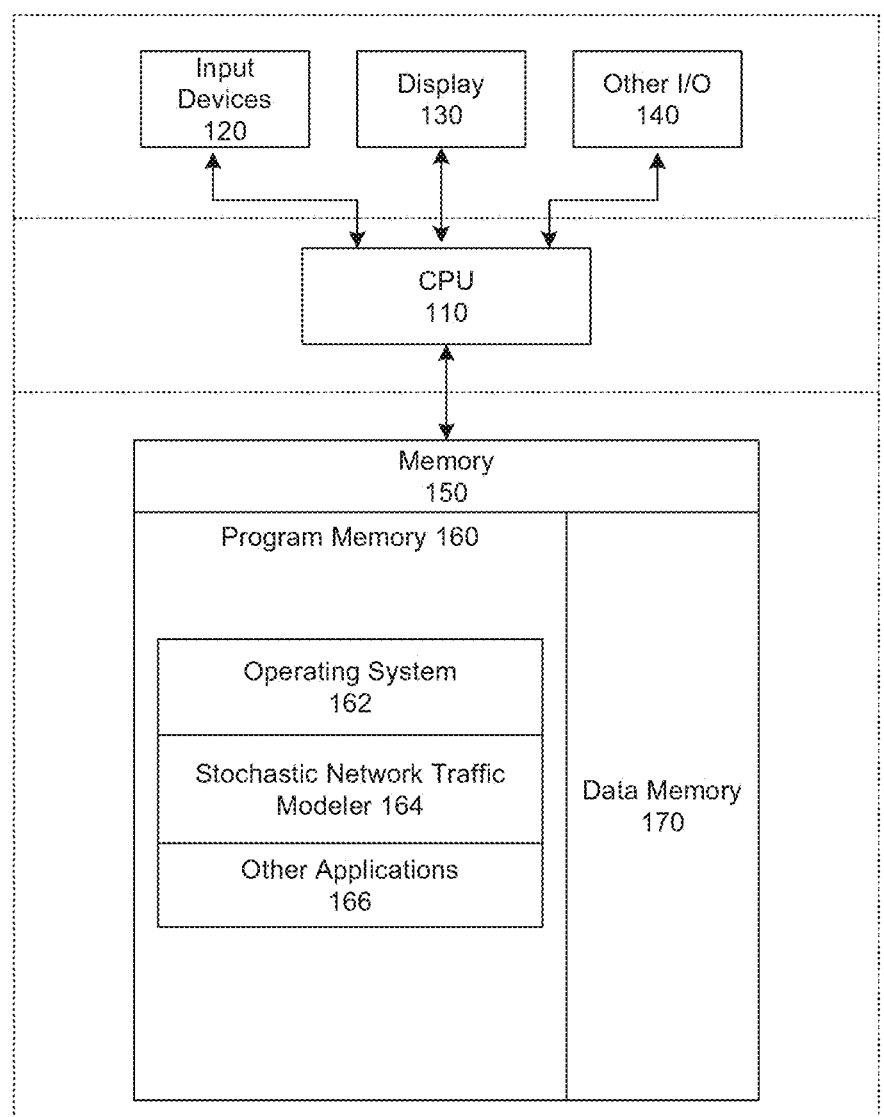
FIG. 1 is a block diagram illustrating an overview of devices on which some implementations can operate.

Embodiments for the modeling of demand in a network are described herein. Though described primarily with respect to the modeling of traffic demand in a data network, it will be appreciated that, as described herein, the model may characterize other types of demands over other types of networks. A stochastic network traffic modeling system determines the ranges of likely traffic demand between nodes in a network. A network "node," as used herein, refers to an asset interconnected by the network, an interconnection point within the network, or a network endpoint. For example, a node may represent a data center, a point of presence, or other computing device or interconnection point connected by a network. As described herein, nodes have demand requirements with respect to other nodes based on the amount of network traffic between the nodes. The stochastic network traffic modeling system generates a model of the ranges of likely amounts of network traffic between each of the nodes in the network. A network planner may utilize the generated stochastic model to evaluate different scenarios of network demand and determine how best to add capacity to the network, or utilize existing capacity, to address the network demands forecasted by the generated model.

The stochastic network traffic modeling system evaluates information describing various aspects of a network. As described herein, the network information includes network component data characterizing network components. For example, the network component data may include a list of all of the network nodes. In some embodiments, the network information additionally includes network connectivity data. The connectivity data may describe, for example, which nodes in the network are directly connected to which other nodes in the network. The connectivity data may describe both bidirectional and unidirectional connections between the nodes. That is, some network connections between network nodes may be capable of two-way communication, while other connections within the network may only support communication from one of the connected nodes to the other connected node.

The network information additionally includes node weight data that characterizes the relative sizes of network nodes a source or sink of traffic in the network. In some embodiments, the node weight data characterizes the relative size of individual nodes. For example, the node corresponding to a data center that is known to handle a significant amount of traffic may be associated with a relatively large weight, while a node corresponding to a little-used interconnection point may be associated with a relatively small weight. In some embodiments, the node weight data characterizes the relative size of traffic between pairs of nodes. For example, heavy network traffic between a node A and a node B may be associated with a relatively large weight, while light network traffic between the node A and a node C may be associated with a relatively small weight.

The network information further includes demand projection data. For example, the demand projection data may reflect an estimate of the overall total demand of the network. That is, the demand projection data may characterize estimated demand for the entirety of the network as opposed to characterizing estimates for any individual node or flow between nodes.

Based on the network information, including network component, node weight data, and demand projection data, the system generates a stochastic model of demand within the network. The model is stochastic in that it represents a probabilistic model of demand within the network. That is, the model may determine that there is a 10% probability of demand of 500 gigabits per second (Gbps) between two nodes, a 35% probability of 600 Gbps demand between the two nodes, and a 5% probability of 700 Gbps demand between the two nodes. In some embodiments the stochastic model may generate a model of the cumulative distribution of demand within the network. That is, the model may determine that there is a 10% probability that demand between two nodes is less than or equal to 300 Gbps, a 50% probability that demand between the two nodes is less than or equal to 400 Gbps, and a 90% probability that demand between the two nodes is less than or equal to 475 Gbps. In contrast to a deterministic model of network demand, in which forecasted demand is represented by a single predicted value, the stochastic model of network demand represents a range of forecasted demands based on the network information. As compared to the deterministic model, it is more likely that actual network demands will fall into the ranges generated by the stochastic model.

In some embodiments, the forecasted directional demand between a source and destination node (or "source-destination pair") in the stochastic model represents the total predicted demand from the source node to the destination node, regardless of how the nodes are connected. That is, the nodes of the source-destination pair may not be directly connected by a network connection, though network traffic may still travel from the source node to the destination node over paths through other nodes. Accordingly, the generated stochastic model would characterize, generally, the total directional demand between the nodes of the source-destination pair over any network paths. In some embodiments, the forecasted demand between a source-destination pair in the stochastic model reflects the predicted demand over a direct network connection, or network link, from the source node to the destination node. That the two nodes of the source-destination pair are directly connected may be provided, for example, by network connectivity data included in the network information.

As described herein, the system generates the stochastic model of demand based on a Monte Carlo simulation or similar technique. For example, the system may perform multiple trials, where each trial independently allocates the demand projection data to the source-destination pairs found in the network. Allocations within each of the trials may be randomly generated based the weight data. The system then generates the stochastic model based on the allocations across all of the trials.

In some embodiments, at least one of the elements of the network information (e.g., the network component data, node weight data, or demand projection data) is associated with a time period, and the network information includes data for multiple time periods. For example, a time period may correspond to a quarter (e.g., 2016Q1, 2016Q2, etc.), and the network information may include different demand projections for each of multiple quarters, where each projection represents a forecasted overall network demand for the corresponding quarter. As a further example, a time period may correspond to a year (e.g., 2016, 2017, 2018, etc.), and the network information may include different demand projections and network component data for each of multiple years (corresponding to forecasted overall demand for each year, and forecasted network changes based on expected network build-outs, respectively). The system may then generate a stochastic model of demand that captures each of the time periods included in the network. For example, when the network information includes multiple time periods, the system may perform Monte Carlo simulations for each of the time periods, where each simulation uses the network information associated with that time period (or, in the case of an element of network information unassociated with time periods, the same information for each of the Monte Carlo simulations).

In some embodiments, the network information additionally characterizes different "services" of the network, where each service is a flow associated with a particular application that generates traffic between nodes in the network. The system may use the network information regarding the services to generate a services-aware stochastic model of network traffic demands. That is, the stochastic model may characterize, for each of the source-destination pairs in the network, the distribution of demand probability for each of the different services that flow through the network. Service characterizing data may be included in the network information in the form of service-specific demand projection data. That is, the system may utilize different service-specific demand projections to independently generate per-service demand distributions, which combine to form the services-aware stochastic model. Service characterizing data may also be included in the network information in the form of weight data. That is, in addition to allocating overall demand projection data between different nodes based on node weights, the demands may be further allocated to services flowing between those nodes based on service weights (i.e., a first service has a weight of 0.20, a second service has a weight of 0.15, etc.).

Although described primarily with respect to a probabilistic model of a computer network, in which nodes represent computing systems of the computer network and demand represents data traffic between the computing systems, it will be appreciated that the system can be used to generate a stochastic model of demand in other contexts. For example, the system can be used to generate a stochastic model of vehicular traffic in a transportation network, where nodes represent intersections or other roadway interconnections and demand represents the volume of vehicular traffic between those interconnections. As an additional example, the system can be used to generate a stochastic model of air traffic, where nodes represent airports and demand represents the volume of passengers flying between those airports. As a further example, the system can be used to generate a stochastic model of goods transportation, where nodes represent warehouses and demand represents the volume/value/etc. of commodities transported between the warehouses. Furthermore, though the recited examples demonstrate point-to-point demands, it will be appreciated that the system can generated stochastic models for point-to-multipoint and multipoint-to-multipoint demands.

The disclosed system has several advantages. Although some of those advantages are described in this disclosure, not all advantages are required in each implementation of the stochastic network traffic modeling system. Additionally, some advantages will become apparent to those having ordinary skill in the art after reviewing the disclosure. One advantage of the system is that it is more likely than a deterministic model to accurately forecast future demand in a network. By generating a stochastic model of demand that provides the probabilities of different levels of demand between different nodes in a network, there is a significant likelihood that the true future demands are within the ranges of the forecasted probabilities. In contrast, a deterministic model is nearly always wrong. Another advantage of the system is that it enables network planners to plan more effectively. For example, by providing a stochastic model such as a cumulative probability, a network planner may plan according to different levels of aggressiveness or conservatism based on network needs. That is, for mission-critical nodes the network planner may plan according to the 99% cumulative probability demand (i.e., the demand at which there is a 99% probability that demand will be at or less than the given value), while for less critical nodes the network planner may plan according to the 70% cumulative probability demand. It will be appreciated that other efficiencies may be realized by network planners based on the use of the stochastic network traffic model.

Suitable Environments

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that perform stochastic network traffic modeling. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, stochastic network traffic modeler 164, and other application programs 166. Memory 150 can also include data memory 170 that can include (1) network information such as network component data, network connectivity data, node weight data, or demand projection data, (2) generated stochastic models for one or more time periods based on the network information, (3) generated reports that characterize the modeled probabilistic demands, (4) configuration data, (5) settings, (6) user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
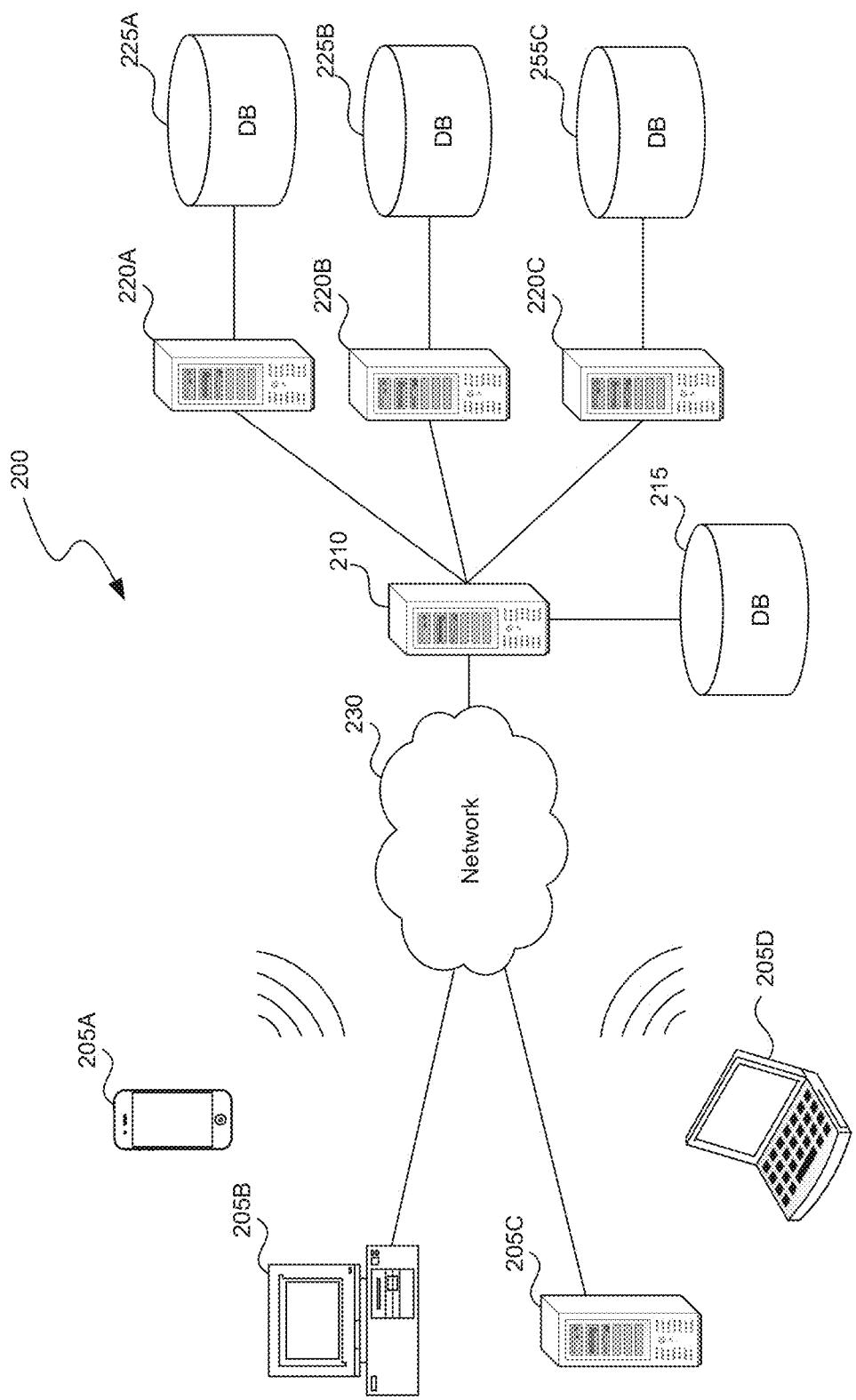
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as network component data, node weight data, demand projection data, stochastic network models, and other generated reports. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
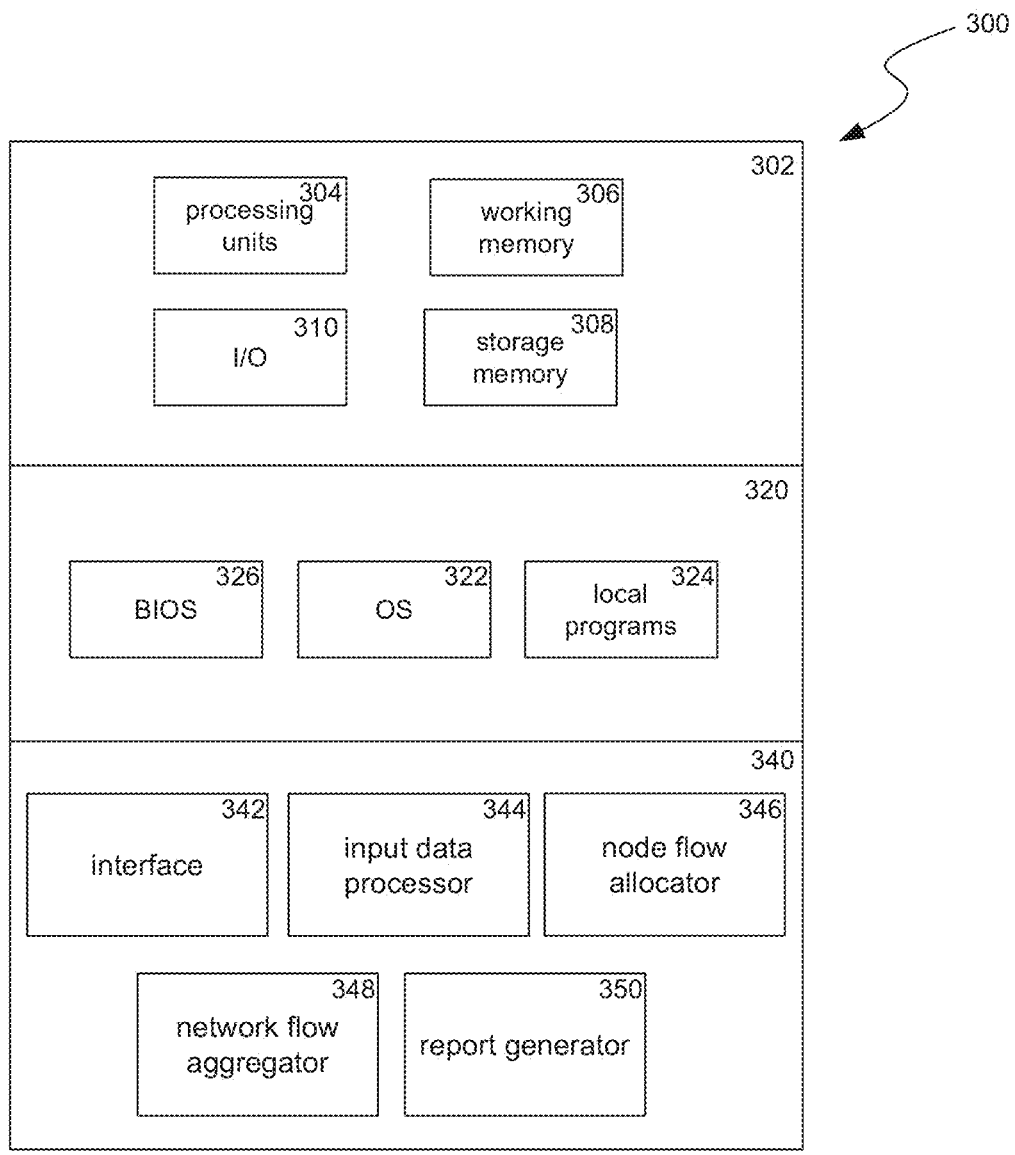
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include input data processor 344, node flow allocator 346, network flow aggregator 348, report generator 350, and components which can be used for transferring data and controlling the specialized components, such as interface 342. In some implementations, components 300 can be in a computing system that is distributed across multiple computing devices or can be an interface to a server-based application executing one or more of specialized components 340.

The input data processor 344 can be configured to receive and process input data, such as network information characterizing a backbone network. The network information includes data describing different aspects of a backbone network. For example, the network information may include component data describing which nodes are in the network, and may further include network connectivity data describing how the different nodes are connected to one another. The nodes may represent computing systems or interconnection points or endpoints in a data network, and the connections may represent data connections, such as over fiber cable, copper-based cable, or physical cable, between the nodes of the data network. The network information may additionally include data describing weightings of the backbone network, which characterize which nodes are the most significant source or sink of data in the network, or between which source-destination pairs there is the most traffic. The network information may further include data describing an overall projected demand for the network. The network information may be associated with different time periods, which captures network information (such as components, weights, or demand projections) that change with time periods. The network information may, for example, be received from a user of the system wishing to evaluate how capacity should be added or allocated to the backbone network over time. Once received, the input data processor may validate the input data to verify that the data is complete and consistent. For example, the input data processor may verify that each node is connected to at least one other node. As a further example, the input data processor may verify that the weight data does not list any nodes not defined in the network component data. The input data may be formatted for use by the rest of the system. For example, the input data may be received in the form of a spreadsheet, a table, a text document of comma-separated values, or some other human-readable format utilized by network planners using the system, and formatted into an internal format for system use.

The node flow allocator 346 can be used to determine how overall network demand may be allocated to different source-destination pairs in a network. The allocation performed by the node flow allocator may represent the result of, for example, a single iteration of a multi-iteration simulation used to generate a probabilistic model of demand. In some embodiments, the overall network demand is divided into multiple demand blocks, where each demand block represents a portion of the overall demand (e.g., each block may be 5 Gbps, or 10 Gbps, etc.). Each of the individual demand blocks may then be independently allocated to a source-destination pair. To allocate an individual demand block, the node flow allocator may, for example, select a node from the network as a source node based on node weight data. The node flow allocator may then generate adjusted node weight data based on the selected source node, and based on the adjusted node weight data, select a destination node. The selected source and destination node, in combination, define the selected source-destination pair. The demand block may then be allocated to the source-destination pair (i.e., to go from the source node to the destination node of the pair), and the process may be repeated until all demand blocks are allocated. As described herein, the node flow allocator may ensure that demand blocks are only allocated to valid source-destination pair. For example, it may be known that no traffic flows between two particular nodes (as defined, for example, in the network information or other configuration data). As a further example, in embodiments in which the system generates probabilistic demand projections for direct connections between nodes, it may be known that no direct connection (or no connection of valid directionality) exists between two particular nodes (as defined, for example, in network connectivity data). It will be appreciated that in contrast to the final stochastic model generated by the system, each demand allocation generated by the node flow allocator is deterministic (i.e., each allocation assigns a single demand value to each source-destination pair).

The network flow aggregator 348 can be configured to aggregate multiple independent network demand allocations (each of which may be generated by node flow allocator 346, for example) into a stochastic model of network demand. As described herein, since each of the allocations generated by the node flow allocator are generated independently and based on weighted probabilistic selections, at least some of the resulting allocations will be different from one another (e.g., one allocates 400 Gbps to a source-destination pair, another allocates 280 Gbps to the same source-destination pair, etc.). Based on the generated allocations, the network flow aggregator determines the stochastic demand for each source-destination pair. For example, if three allocations were generated (i.e., three simulation trials were performed), and the first allocation allocated a demand of 400 Gbps to a source-destination pair, the second allocation allocated a demand of 280 Gbps to the source-destination pair, and the third allocation allocated a demand of 400 Gbps to the source-destination pair, then for that source-destination pair the network flow aggregator may generate a stochastic demand that represents a 66% probability of 400 Gbps demand and a 33% probability of 280 Gbps demand from the source to the destination of the source-destination pair. That is, the demand generated by the network flow aggregator for each source-destination pair is a distribution of demands and probabilities based on the allocations. The network flow aggregator generates such demand distributions for each of the source-destination pairs in the network, thereby forming the stochastic model of demand in the network. The stochastic model may additionally include per-time period distributions of demand, based on network information that changes with time periods (e.g., changes in overall network demand, network components, or node weights across different quarters, years, etc.).

The report generator 350 may be configured to generate reports based on the generated stochastic network traffic model. For example, the reports may describe the probability distribution of different levels of demand for one or more source-destination pairs in the network. The reports may further describe the distributions of demand over one or more time periods. The generated reports may be both textual (e.g., tables) and graphical (e.g., graphs illustrating the different probabilities for different levels of demand between a source-destination pair). The reports may be used, for example, by network planners to determine how to effectively add capacity to or utilize capacity within a network to address forecasted demand needs.

Illustrations of Deterministic and Stochastic Demands

Figure 4:
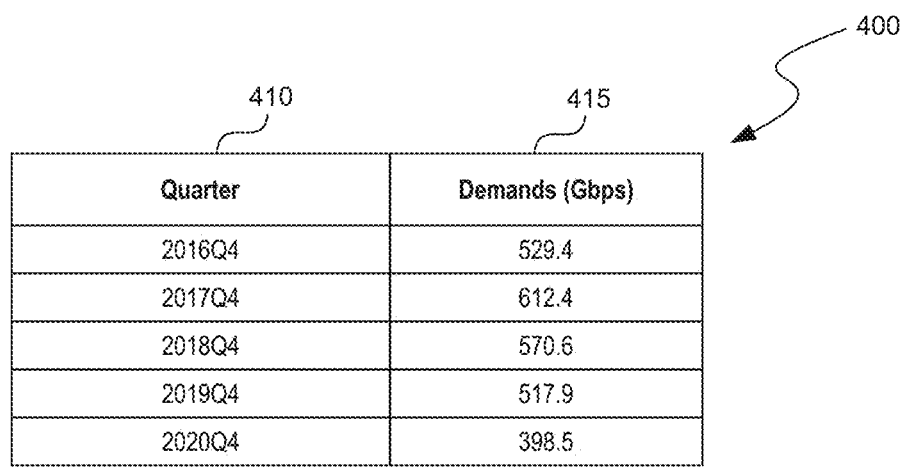
FIG. 4 illustrates an example representation of deterministic demand in a backbone network.
Figure 5:
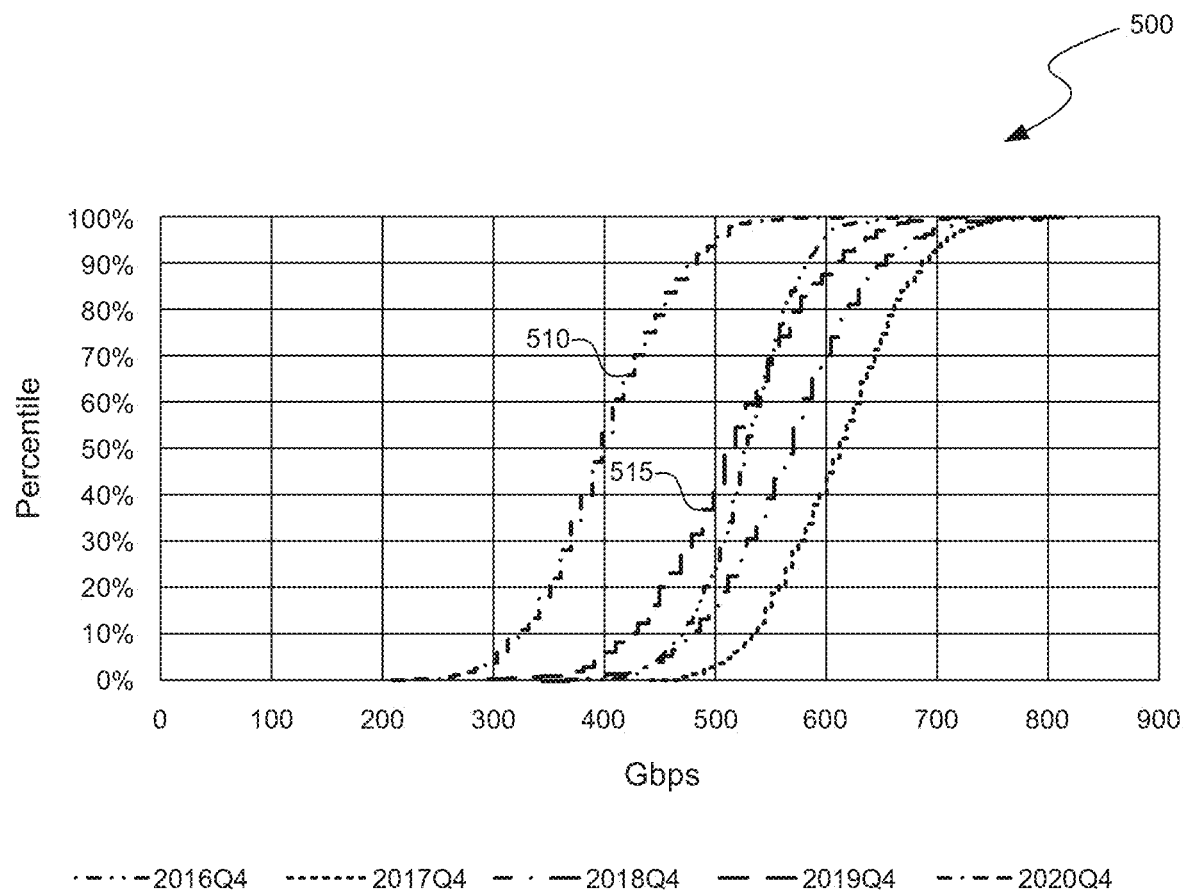
FIG. 5 illustrates an example representation of stochastic demand in a backbone network.

FIGS. 4 and 5 illustrate example representations of deterministic and stochastic demand of a network, respectively. FIGS. 4 and 5 are intended to be illustrative of what is meant by deterministic demand and stochastic demand. Additionally, FIGS. 4 and 5 also illustrate information that may be used or generated by the stochastic network traffic modeling system. For example, the system may use a deterministic demand forecast, such as illustrated in FIG. 4, as a parameter for generating a stochastic model of demand. As a further example, the system may generate a report of stochastic demand as illustrated in FIG. 5.

FIG. 4 illustrates a table 400 of deterministic demand values. The demand values may correspond to the total demand across a network, the demand associated with an individual connection within a network, the demand associated with traffic from a source node to a destination node, the demand associated with a single node in the network, etc. The table includes a time period field 410 (in the example illustrated in FIG. 4, each time period is a quarter) and a demand field 415. The table includes, for each time period, a demand value. It will be appreciated that each time period's demand is characterized by a single value. That is, for example, the table indicates a demand of 529.4 Gbps associated with the fourth quarter of 2016, a demand of 612.4 Gbps associated with the fourth quarter of 2017, etc.

FIG. 5 illustrates a graph 500 of stochastic demand values. The demand values may correspond to the total demand across a network, the demand associated with an individual connection within a network, the demand associated with traffic from a source node to a destination node, the demand associated with a single node in the network, etc. In contrast to a deterministic model in which demand is characterized by a single value, such as illustrated in FIG. 4, the stochastic model of demand is characterized by a probabilistic range or distribution of values. For example, FIG. 5 illustrates different demand curves, where each curve is for a different time period, of cumulative demand probabilities. For example, demand curve 510 represents the demand for 2018Q4, and illustrates a projection that there is a 10% probability of at most 320 Gbps of demand, a 50% probability of at most 400 Gbps of demand, a 90% probability of at most 475 Gbps of demand, etc. As a further example, demand curve 515 represents the demand for 2019Q4, and illustrates a projection that there is a 20% probability of at most 450 Gbps of demand, a 40% probability of at most 500 Gbps of demand, a 90% probability of at most 600 Gbps of demand, etc. In other words, the stochastic demand captures the probabilities of different levels of demand.

Flows for a Stochastic Network Traffic Modeling System

Figure 6A:
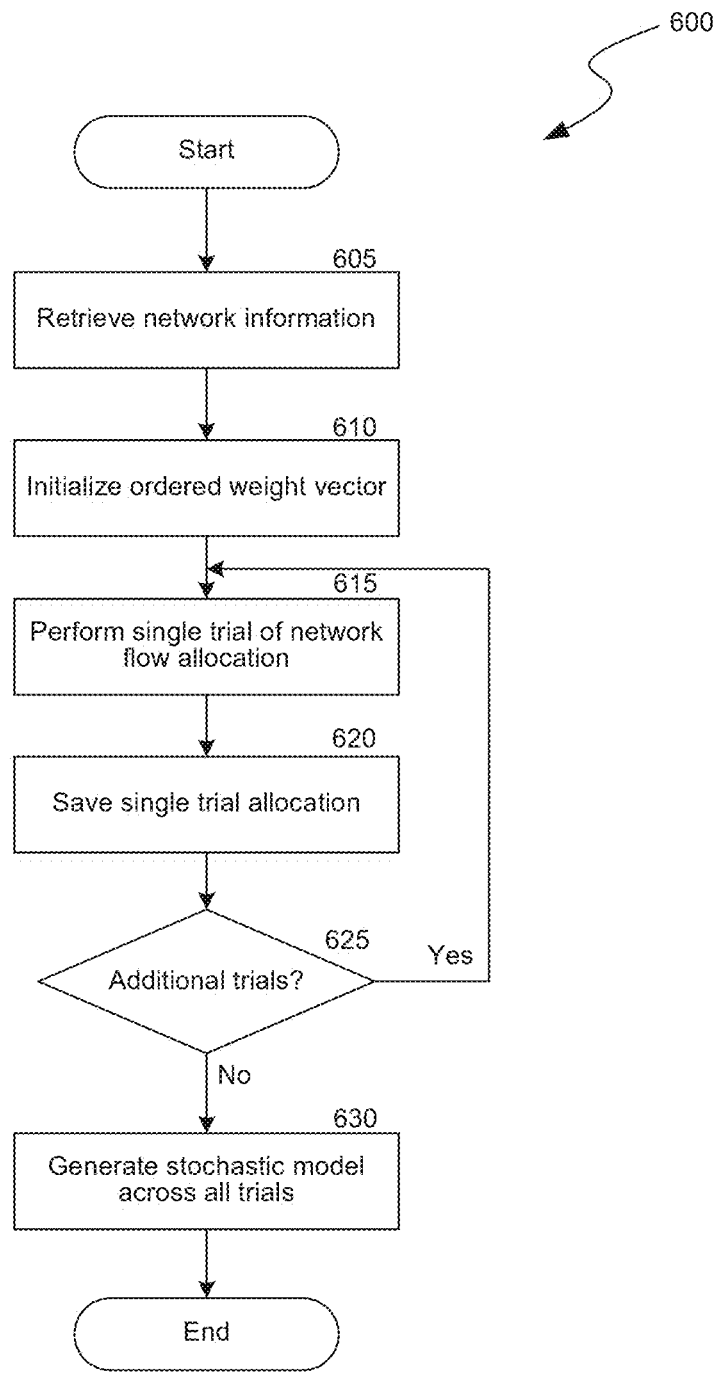
FIG. 6A is a flow diagram illustrating a process, used in some implementations of a stochastic network traffic modeling system, for generating a stochastic network traffic model.

FIG. 6A is a flowchart illustrating an example process 600, implemented by the stochastic network traffic modeling system, for generating a stochastic network traffic model. As described herein, a stochastic network traffic model characterizes the traffic demands within a network as a distribution of demand probabilities; that is, it provides the probabilities for different levels of demand. Broadly characterized, the process 600 at blocks 615 through 625 performs multiple demand simulation trials, each of which generates a single demand value for each of the source-destination pairs of the network. Then at block 630, the process 600 generates the stochastic model based on the results of the multiple trials.

At a block 605, the system retrieves network information characterizing a network to be modeled. The network information includes data describing the network (i.e., the nodes that form the network), data describing a demand projection of the entire network, and weight data describing which elements of the network have a relatively large or small impact on or need for demand (e.g., which nodes are a relatively large or small source or sink of network traffic, between which source-destination pairs a relatively large or small volume of traffic flows, etc.). The different elements of the network information may additionally be associated with multiple time periods, thereby describing changes in the network nodes, demand, or weights over time. The network information may be entered by a user of the stochastic network traffic modeling system, retrieved from a file record of previously entered or forecasted data, or other.

Figure 7:
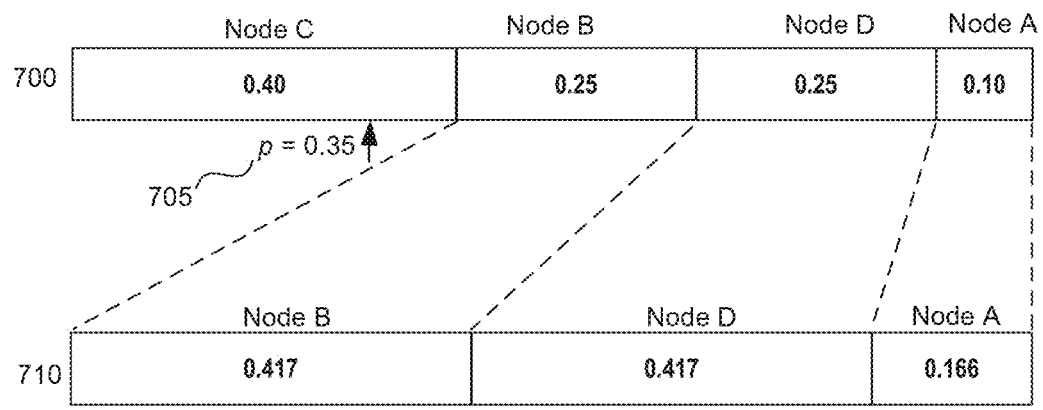
FIG. 7 illustrates an example weight vector used, in some implementations of a stochastic network traffic modeling system, to identify a first and second node.

At a block 610, the system generates an initial ordered weight vector based on the retrieved network information. The ordered weight vector characterizes which nodes are known or projected to contribute relatively more or less to network traffic and, as described herein, is used by the system to weight the allocation of overall network demand to the nodes of the network. For example, a network planner may know that a node corresponding to a large data center typically consumes more traffic than average, and accordingly specifies a larger weight for that node. FIG. 7 illustrates an example ordered weight vector.

Referring to FIG. 7, vector 700 illustrates a representation of an example ordered weight vector for a network made up of four nodes (nodes A-D). It may be known (for example, due to historical observations) or predicted (for example, by a network planner) that node A contributes relatively little traffic to overall network traffic, that node C contributes relatively large amounts of overall network traffic, and that nodes B and D contribute average amounts of network traffic. Accordingly, weight data, such as provided by a network planner and included in the network information, may indicate a weight of 10% to node A, a weight of 40% to node C, and weights of 25% to each of nodes B and D. Based on the weight data the system may generate an ordered weight vector, such as illustrated by vector 700. The ordered weight vector 700 reflects the weights provided for each of the nodes. Furthermore, the ordered weight vector 700 is ordered by weight such that the highest weighted nodes appear first in the vector (in the illustration of FIG. 7, moving from left to right).

Returning to FIG. 6A, at a block 615 the system performs a single trial network traffic allocation to the nodes of the network. As described herein, an individual network traffic allocation trial assigns to each source-destination pair a single traffic demand value (in contrast to, for example, a stochastic model of demand). The operation of block 615 is described in greater detail in FIG. 6B.

Figure 6B:
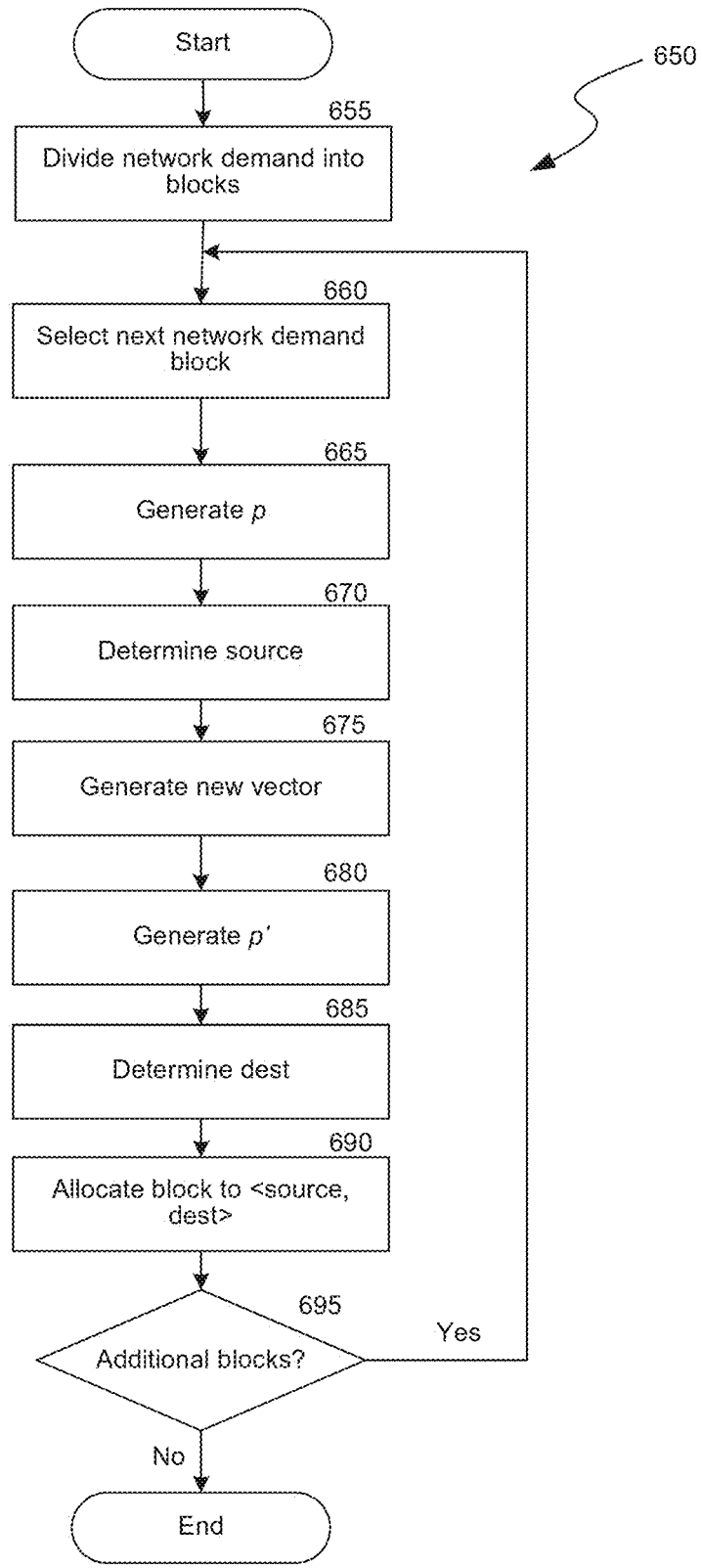
FIG. 6B is a flow diagram illustrating a process, used in some implementations of a stochastic network traffic modeling system, for performing a single iteration of a probabilistic network demand allocation.

FIG. 6B is a flow diagram illustrating a process 650 for performing a single trial, or iteration, of probabilistic network demand allocation. Although the process 650 illustrates one approach for allocating network demand, based on the use of an initial and an adjusted ordered weight vector, other evaluative approaches may be used. For example, as discussed below, a weight matrix may be used for each iteration of network demand allocation.

At a block 655, the system divides overall network demand into multiple demand blocks. As described herein, the overall network demand may be included in the retrieved network information and may reflect, for example, a network planner's or other derived estimate of the overall traffic demand needs of the entire network. The network information may include different overall network demands for different time periods (e.g., a demand of 2700 Gbps for 2017Q4, a demand of 2850 Gbps for 2018Q4), and the block 655 may use the overall network demand associated with the time period for which the trial is being performed. The size of each demand block may vary and may, for example, be a parameter set by a user of the system. The number of demand blocks is a function of the demand block size and the amount of overall network demand. For example, if the time period being simulated is associated with 2700 Gbps, and the configured demand block size is 10 Gbps, then the system will divide the overall network demand into 270 demand blocks of 10 Gbps each.

At a block 660, the system selects a network demand block to be allocated to a source-destination pair in the network.

At a block 665, the system generates a number p. The number p may be drawn, for example, from a uniform distribution in the [0, 1] range. That is, there may be a uniform probability of selecting any real number in the inclusive range between 0 and 1. In some embodiments, other distributions in the [0, 1] range may be used.

At a block 670, the system determines a source node for the demand block allocation. The source node is determined by identifying a node in the initial ordered weight vector (for example, as generated at the block 610 of FIG. 6A) based on the generated p. The node may be determined, for example, by identifying the node in the ordered weight vector with a cumulative probability greater than or equal to p, and where the cumulative probability of the prior node in the ordered weight vector is less than p. For example, referring again to the example ordered weight vector 700 in FIG. 7, a value of p less than or equal to 0.4 would result in the selection of node C, a value of p greater than 0.4 and less than or equal to 0.65 would result in the selection of node B, a value of p greater than 0.65 and less than or equal to 0.90 would result in the selection of node D, and a value of p greater than 0.9 would result in the selection of node A. As illustrated in FIG. 7, a p equal to 0.35 yields node C as the source node.

Returning to FIG. 6B, at a block 675 the system generates a new ordered weight vector. The system generates the new ordered weight vector by omitting the node identified as the source node and adjusting the weights of the remaining nodes such that the sum of the weights equal 1. The weights of the remaining nodes may be adjusted proportionally to their weights in the initial ordered weight vector. For example, returning to the example illustrated in FIG. 7, node C has been selected as the source node from the initial ordered weight vector 700. To generate the new ordered weight vector 710, the system determines adjusted weights for the remaining nodes A, B, and D. As illustrated, each of the weights in the new ordered weight vector 710 are adjusted proportionally such that their cumulative weight equals 1. For example, node B's initial weight of 0.25 is adjusted to 0.417

$$\left(\frac{0.25}{0.25 + 0.25 + 0.1} = 0.417\right),$$

and node A's initial weight of 0.10 is adjusted to 0.166

$$\left(\frac{0.1}{0.25 + 0.25 + 0.1} = 0.166\right).$$

It will be appreciated that other approaches for adjusting weights of the remaining nodes may be used.

Returning to FIG. 6B, at a block 680 the system generates a number p'. The number p' may be drawn, for example, from a uniform distribution in the [0, 1] range. That is, there may be a uniform probability of selecting any real number in the inclusive range between 0 and 1. In some embodiments, other distributions in the [0, 1] range may be used.

At a block 685, the system determines a destination node for the demand block allocation. The destination node is determined by identifying a node in the new ordered weight vector (for example, as generated at the block 675) based on the generated p'. The node may be determined, for example, by identifying the node in the ordered weight vector with a cumulative probability greater than or equal to p', and where the cumulative probability of the prior node in the ordered weight vector is less than p'. For example, referring to the example new ordered weight vector 710 in FIG. 7, a value of p' less than or equal to 0.417 would result in the selection of node B, a value of p' greater than 0.417 and less than or equal to 0.834 would result in the selection of node D, and a value of p' greater than 0.834 would result in the selection of node A.

Figure 8:
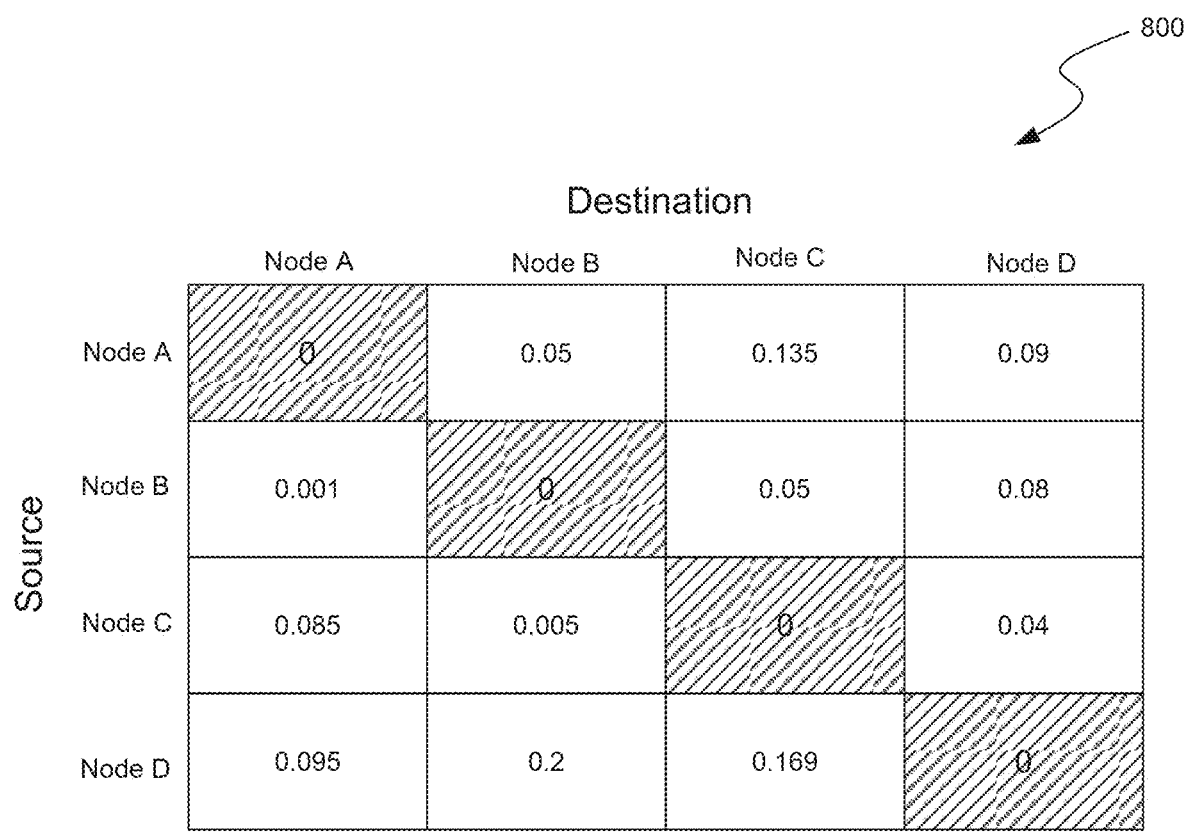
FIG. 8 illustrates an example weight matrix used, in some implementations of a stochastic network traffic modeling system, to identify a first and second node.

Though the process 650 has been described as selecting a source node and a destination node based on an initial ordered weight vector and a second ordered weight vector, respectively, in some embodiments other approaches to weighing demand block allocations may be used. For example, the weight data included in the network information may specify the weight of source-destination pairs instead of the weight of single nodes. Referring to FIG. 8, weight matrix 800 illustrates a representation of example weight data describing source-destination pair weights that may be included in the network information. For example, the weight matrix 800 indicates a weight from node B to node D of 0.08, a weight from node D to node B of 0.2, a weight from node A to node C of 0.135, etc. The weights may be specified such that the sum of the weights in the weight matrix equals 1. It will be appreciated that providing weight data through the weight matrix enables a more granular control of the weightings used by the system, since it enables the specifying of weights for explicit pairs of nodes and the directionality of the flow between the nodes (i.e., which node is the source and which is the destination). Based on the weight matrix, the system may generate an ordered weight vector in which each element of the vector corresponds to a pair of source and destination nodes. For example, based on the illustrated weight matrix 800, the system may generate an ordered weight vector having a first element corresponding to source node D, destination node B, and weight 0.2; a second element corresponding to source node D, destination node C, and weight 0.169; a third element corresponding to source node A, destination node C, and weight 0.135, etc. That is, like the ordered weight vector previously described, the ordered weight vector generated from a weight matrix is sorted by weights (starting from the highest weighted element), where each element corresponds to a source node and destination node (instead of a single node). Using the ordered weight vector generated from the weight matrix, the system may identify a source-destination pair for allocating a demand block based on a single generated p (since the identification of an element based on p yields both a source and destination).

Returning to FIG. 6B, at a block 690 the system allocates the demand block to the source-destination pair. For example, the system may track the amount of demand allocated to each source-destination pair in the network for this trial. When the trial simulation begins (i.e., at the start of process 650), the demands may be initialized to zero. Then, as a demand block is allocated to a particular source-destination pair, the demand of that source-destination pair is incremented by the block size of the demand block (e.g., by 10 Gbps). In other words, the allocation of demand blocks over the course of a trial increases the demand of the associated source-destination pairs.

In some embodiments, the process 600 ensures that demand blocks are only allocated to valid source-destination pairs. For example, it may be known that no traffic flows between two particular nodes (as defined, for example, in the network information or other configuration data). As a further example, in embodiments in which the system generates probabilistic demand projections for direct connections between nodes, it may be known that no direct connection (or no connection of valid directionality) exists between two particular nodes (as defined, for example, in network connectivity data). To ensure that demand blocks are only allocated to valid source-destination pairs, the process may, for example, re-select a destination node (e.g., repeat blocks 680 and 685) until a destination node is selected that is valid for the selected source node. As a further example, the new ordered weight vector (such as constructed at block 675) may be generated to only include nodes that are valid destination nodes for the selected source node (i.e., selected at block 670).

At a decision block 695, the system determines whether there are any additional demand blocks to be allocated. If there are additional demand blocks, the process returns to the block 660 so that the system may select the next demand block and allocate it. Otherwise, the process 650 exits.

Returning to FIG. 6A, at a block 620 the results of the single allocation trial are saved. As described herein, a single allocation reflects a probabilistic (based on weight data) allocation of overall network demand to the source-destination pairs of the network. Each of the demands generated by a single allocation trial correspond to a single value. The system saves the allocations generated by each trial to, as described herein, generate a stochastic model of network demand.

At a decision block 625, the system determines whether to perform additional simulation trials. The number of simulation trials may be a parameter specified by a user of the system, such as a network planner. For example, a user may configure the system to perform 10,000 simulations to generate a stochastic model. If it is determined that the system has not performed the specified number of trails, then the process returns to block 615 to perform an additional trial simulation. If it is determined that the specified number of trials have been performed, then the system continues to a block 630.

At the block 630, the system generates a stochastic model of network traffic demand based on the demand allocations from the different trials. The stochastic model is based on the probabilities of the different levels of demand observed across the different trials. For example, if three allocations were generated (i.e., three simulation trials were performed), and the first allocation allocated a demand of 400 Gbps to a source-destination pair, the second allocation allocated a demand of 280 Gbps to the source-destination pair, and the third allocation allocated a demand of 400 Gbps to the source-destination pair, then for that source-destination pair the network flow aggregator may generate a stochastic demand that represents a 66% probability of 400 Gbps demand and a 33% probability of 280 Gbps. That is, the demand generated by the system for each source-destination pair is a distribution of demands and the probability for those demands based on the trial allocations. The system generates such demand distributions for each of the source-destination pairs, thereby forming the stochastic model of demand in the network. When the network information includes data characterizing the network for multiple time periods the process 600 may repeat for each of the included time periods, thereby generating a stochastic model that characterizes network traffic demands over time.

Services-Aware Allocation of Traffic Demand

Though the stochastic network traffic modeling system has been primarily described as generating a model of overall network demand probabilistically distributed across nodes (for example, as illustrated by process 600 in FIG. 6A), in some embodiments the system generates a model of demand at a greater granularity. For example, the system may further probabilistically allocate demand to different "services" flowing through the network, where each service is flow associated with a particular traffic-generating application. Different services may contribute different levels of traffic demand between the same source and destination nodes.

The system may generate a services-aware stochastic model of demand, based on additional data in the network information that characterizes the network services. For example, the network information may include per-service overall demand projections (e.g., the total demand of a first service is 200 Gbps throughout the network, the total demand of a second service is 185 Gbps throughout the network, etc.). As a further example, the network information may include service weight data (e.g., a first service has a weight of 0.20, a second service has a weight of 0.15, etc.) that characterizes the relative contribution to network demand of the different services in the network.

Using the service characterization data in the network information, the system may generate a services-aware stochastic model. That is, each source-destination pair in the network may be associated with multiple demand distribution curves corresponding to the different services, rather than each source-destination pair being associated with a single demand distribution curve. To generate the services-aware stochastic model the system may, for example, generate multiple stochastic models (for example, using the process 600 illustrated in FIG. 6A), where each model is based on a per-service overall demand projection, and combine the per-service models into an overall services-aware stochastic model. As a further example, when allocating an overall (and services-agnostic) demand projection, the demand may be allocated to services (in addition to being allocated to a source-destination pair) based on weight data associated with the different services.

Illustrative Outputs of a Stochastic Network Traffic Modeling System

The stochastic network traffic model, such as one generated by the process 600 illustrated in FIG. 6A, describes, for one or more time periods, the distribution of different demands that may be required between the different nodes in a network. The system may additionally generate reports or visual outputs that illustrate or otherwise convey aspects of the generated stochastic model.

FIG. 5 illustrates an example graph depicting, for a sample network, generated stochastic demand curves for the network. The stochastic demand curves may represent the overall demand distribution for a connection in the network, the demand distribution for a particular service flowing through the connection in the network, the demand associated with a node in the network, the demand associated with a particular source-destination pair, etc. The demand curves of FIG. 5, each of which correspond to a particular time period, illustrate the cumulative demand probabilities for the represented service/connection/node/source-destination pair/etc. For example, demand curve 510 represents the demand for 2016Q4, and illustrates a projection that there is a 10% probability of at most 320 Gbps of demand, a 50% probability of at most 400 Gbps of demand, a 90% probability of at most 475 Gbps of demand, etc. As a further example, demand curve 515 represents the demand for 2019Q4, and illustrates a projection that there is a 20% probability of at most 450 Gbps of demand, a 40% probability of at most 500 Gbps of demand, a 90% probability of at most 600 Gbps of demand, etc.

Figure 9:
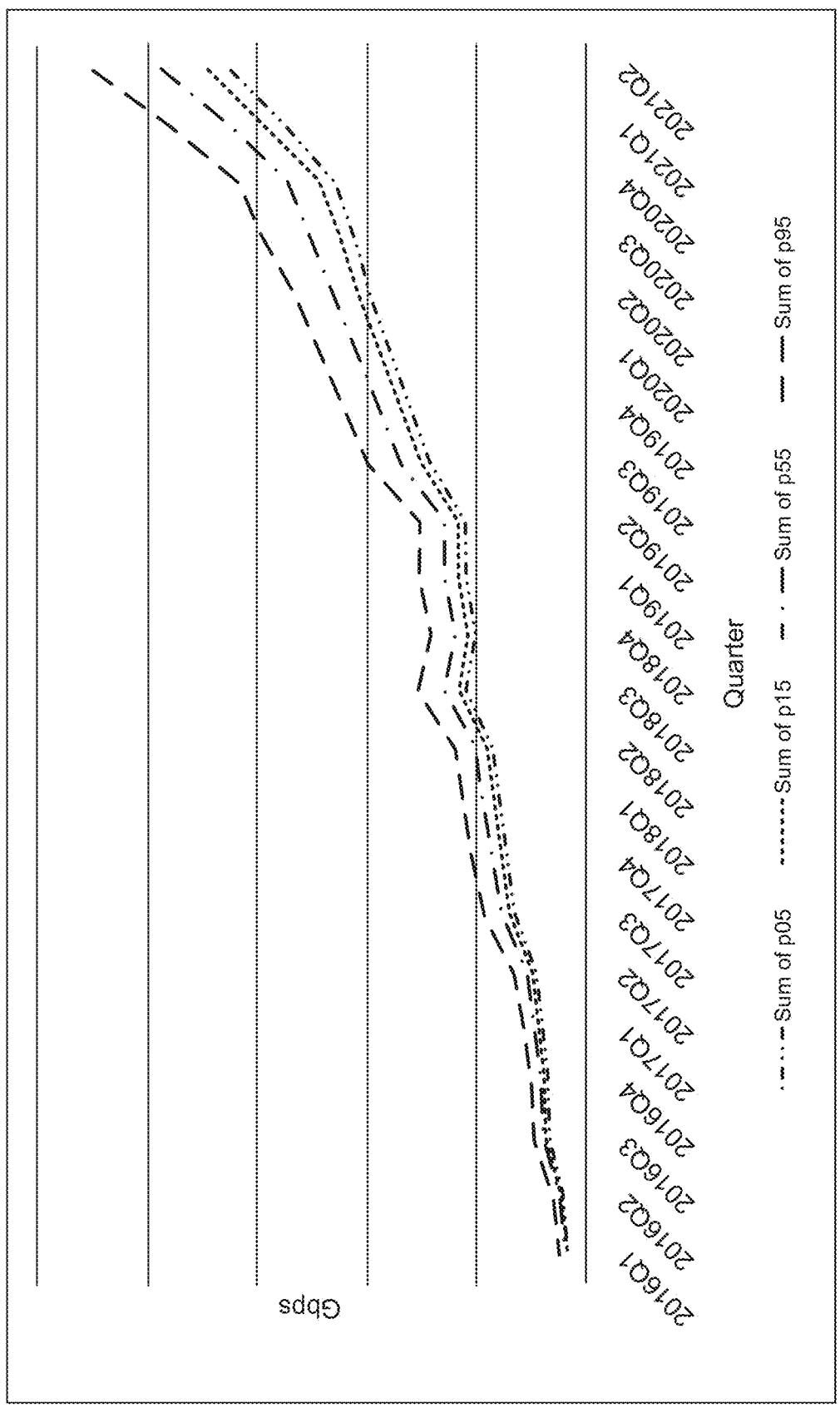
FIG. 9 illustrates an example graphical report generated by a stochastic network traffic modeling system.

FIG. 9 illustrates an example graph depicting, for a sample network, a representation of overall demand expected in a network corresponding to different levels of probability that the expected demand will not be exceeded. That is, the curve labeled "Sum of p05" illustrates, for each of the time periods, the demand at which there is a 5% probability of the actual overall network demand being less than or equal to the depicted demand. As a further example, the curve labeled "Sum of p55" illustrates, for each of the time periods, the demand at which there is a 55% probability of the actual overall network demand being less than or equal to the depicted demand. In other words, the collection of curves represent the range of demands that might be expected in the network, ranging from lower predicted demands and lower probabilities that the predicted demands will satisfy actual demand (e.g., p05), to higher predicted demands and corresponding higher probabilities that the predicted demands will satisfy actual demand (e.g., p95). The different curves therefore enable a network planner to plan for network traffic at varying levels of aggressive or conservative planning. Each curve may be generated, for example, by summing the cumulative probability demand, for the corresponding probability, across each of the individual source-destination pairs. For example, the p15 curve may be generated by summing the demands of each of the source-destinations pairs at the 15% cumulative probability (such as illustrated in FIG. 5).

CONCLUSION

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method in a computing system, comprising:
receiving, at a computing system, network information characterizing a network, the network information comprising a plurality of nodes found in the network and an overall network demand;
generating a weight vector comprised of weights for each of the plurality of nodes;
performing a plurality of stochastic simulations assigning overall network demand to the network nodes, at least some of the stochastic simulations performed by:
dividing the overall network demand into a plurality of demand blocks; and
allocating the plurality of demand blocks by, for each demand block:
determining a first node, based on the weight vector, from the plurality of nodes;
generating, based on the determined first node, a second weight vector comprised of weights for each of the plurality of nodes other than the first node;
determining a second node, based on the second weight vector, from the plurality of nodes; and
allocating the demand block to the combination of the first node and the second node; and
generating a stochastic model of network demand between pairs of network nodes based on the plurality of stochastic simulations.

2. The method of claim 1, wherein the network information further comprises a plurality of overall network demands each associated with a time period, the method further comprising:
performing a plurality of stochastic simulations assigning overall network demand, for each of the plurality of overall network demands, to the network nodes; and
generating a stochastic model, for each of the plurality of overall network demands, between pairs of network nodes based on the performed stochastic simulations.

3. The method of claim 2, wherein each time period is a fiscal quarter.

4. The method of claim 1, wherein each demand block represents 10 gigabits per second (Gbps).

5. The method of claim 1, wherein the network information further comprises node weights, and wherein the weight vector is generated based on the node weights.

6. The method of claim 1, further comprising displaying, on a computing system display, an illustration of the stochastic model of network demand between pairs of network nodes.

7. The method of claim 1, wherein at least one stochastic simulation is performed using a Monte Carlo simulation.

8. The method of claim 1, wherein each node represents a data center or a point of presence (PoP) in a data network.

9. The method of claim 1, wherein the network provides a plurality of services, and wherein each weight of the weight vector and the second weight vector is associated with a service from the plurality of services.

10. The method of claim 1, wherein the weight vector is an ordered vector sorted by weight from low to high, and wherein the sum of the weights of the weight vector equals 1.

11. The method of claim 10, wherein determining the first node comprises:
selecting a number p from a uniform distribution in the [0,1] range; and
identifying the first node, in the ordered weight vector, with a weight larger than or equal to p.

12. The method of claim 10, wherein generating the second weight vector comprises:
proportionally adjusting the weights for each of the plurality of nodes, other than the first node, so that the sum of the proportionally adjusted weights equals 1; and
constructing the second weight vector from the proportionally adjusted weights.

13. The method of claim 1, wherein the first node is a source node and the second node is a destination node.

14. A system comprising:
an input data processor configured to:
receive network information characterizing a network, the network information comprising a plurality of nodes found in the network and an overall network demand;
a node flow allocator configured to:
generate a weight vector comprised of weights for each of the plurality of nodes; and
perform a stochastic simulation assigning overall network demand to the network nodes by:
dividing the overall network demand into a plurality of demand blocks; and
allocating the plurality of demand blocks by, for each demand block:
determining a first node, based on the weight vector, from the plurality of nodes;
generating, based on the determined first node, a second weight vector comprised of weights for each of the plurality of nodes other than the first node;
determining a second node, based on the second weight vector, from the plurality of nodes; and
allocating the demand block to the combination of the first node and the second node; and
a network flow aggregator configured to:
generate a stochastic model of network demand between pairs of network nodes based on a plurality of stochastic simulations.

15. The system of claim 14, wherein the network information further comprises a plurality of overall network demands each associated with a time period, wherein:
the node flow allocated is further configured to perform a plurality of stochastic simulations assigning overall network demand, for each of the plurality of overall network demands, to the network nodes; and
the network flow aggregator is further configured to generate a stochastic model, for each of the plurality of overall network demands, between pairs of network nodes based on the performed stochastic simulations.

16. The system of claim 14, wherein the network information further comprises node weights, and wherein the weight vector is generated based on the node weights.

17. The system of claim 14, wherein the network provides a plurality of services, and wherein each weight of the weight vector and the second weight vector is associated with a service from the plurality of services.

18. The system of claim 14, wherein the weight vector is an ordered vector sorted by weight from low to high, and wherein the sum of the weights of the weight vector equals 1.

19. A non-transitory computer-readable storage medium comprising instructions that, when executed by a computing system, cause the computing system to perform operations comprising:
receiving, at a computing system, network information characterizing a network, the network information comprising a plurality of nodes found in the network and an overall network demand;

generating a weight vector comprised of weights for each of the plurality of nodes;

performing a plurality of stochastic simulations assigning overall network demand to the network nodes, at least some of the stochastic simulations performed by:

dividing the overall network demand into a plurality of demand blocks; and allocating the plurality of demand blocks by, for each demand block:

determining a first node, based on the weight vector, from the plurality of nodes;

generating, based on the determined first node, a second weight vector comprised of weights for each of the plurality of nodes other than the first node;

determining a second node, based on the second weight vector, from the plurality of nodes; and allocating the demand block to the combination of the first node and the second node; and generating a stochastic model of network demand between pairs of network nodes based on the plurality of stochastic simulations.

20. The computer-readable storage medium of claim 19, wherein the first node is a source node and the second node is a destination node.

\* \* \* \* \*

UNITED STATES PATENT AND TRADEMARK OFFICE
CERTIFICATE OF CORRECTION

PATENT NO. : 10,592,585 B2
APPLICATION NO. : 15/402154
DATED : March 17, 2020
INVENTOR(S) : Josue Israel Kuri Obregon It is certified that error appears in the above-identified patent and that said Letters Patent is hereby corrected as shown below:

In the Claims

In Column 19, Line 24, Claim 20, delete "computer-readable storage medium" and insert -- non-transitory computer-readable storage medium --, therefor.

Signed and Sealed this
Twenty-eighth Day of April, 2020

Andrei Iancu
*Director of the United States Patent and Trademark Office*